United States Patent
Sezi

(10) Patent No.: US 8,271,214 B2
(45) Date of Patent: Sep. 18, 2012

(54) METHOD FOR INCREASING THE SENSITIVITY OF A DIFFERENTIAL PROTECTION SYSTEM

(75) Inventor: Tevfik Sezi, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 414 days.

(21) Appl. No.: 12/665,523

(22) PCT Filed: Jun. 27, 2007

(86) PCT No.: PCT/EP2007/005891
§ 371 (c)(1),
(2), (4) Date: Dec. 18, 2009

(87) PCT Pub. No.: WO2009/000304
PCT Pub. Date: Dec. 31, 2008

(65) Prior Publication Data
US 2010/0191386 A1 Jul. 29, 2010

(51) Int. Cl.
*G06F 15/18* (2006.01)
(52) U.S. Cl. ............... 702/59; 702/58; 361/62; 361/63; 361/64; 361/66; 361/68; 324/522; 324/424; 700/292; 706/12
(58) Field of Classification Search ............... 702/58, 702/59; 361/62, 63, 64, 65, 66, 68, 80, 92, 361/87; 324/522, 424, 617, 525; 700/292; 706/12
See application file for complete search history.

(56) References Cited

U.S. PATENT DOCUMENTS

| | | | | |
|---|---|---|---|---|
| 4,402,028 A * | 8/1983 | Udren | | 367/36 |
| 4,855,861 A * | 8/1989 | Bergman et al. | | 361/65 |
| 5,375,026 A * | 12/1994 | Eriksson et al. | | 361/63 |
| 6,525,543 B1 * | 2/2003 | Roberts et al. | | 324/522 |
| 7,660,088 B2 * | 2/2010 | Mooney et al. | | 361/63 |
| 7,973,427 B2 * | 7/2011 | Korba et al. | | 307/43 |
| 2004/0027748 A1 * | 2/2004 | Kojovic et al. | | 361/62 |
| 2011/0063761 A1 * | 3/2011 | Kasztenny et al. | | 361/36 |
| 2011/0098951 A1 * | 4/2011 | Jurisch | | 702/58 |
| 2011/0310518 A1 * | 12/2011 | Komatsu et al. | | 361/64 |

FOREIGN PATENT DOCUMENTS

JP 09200945 A * 7/1997

* cited by examiner

*Primary Examiner* — Carol Tsai
(74) *Attorney, Agent, or Firm* — Laurence A. Greenberg; Werner H. Stemer; Ralph E. Locher

(57) ABSTRACT

A differential protection system has a differential protection device at each end of a line section of an electrical power transmission line, such that it can selectively identify and safely disconnect even high-impedance faults on the monitored line section. The sensitivity of the system is improved by: detection of current vector measured values which indicate the current flowing in the line section by way of the differential protection devices at the ends of the line section during a learning phase; determination of a correction function from the current vector measured values, the correction function indicating a correction factor which is dependent on the amplitude of the current vector measured values of a selected differential protection device, the correction factor compensating for any amplitude difference and any phase difference between the current vector measured values of the differential protection devices; and adjustment of the differential protection system such that the current vector measured values detected after the learning phase by at least one of the differential protection devices are corrected using the correction function.

12 Claims, 4 Drawing Sheets

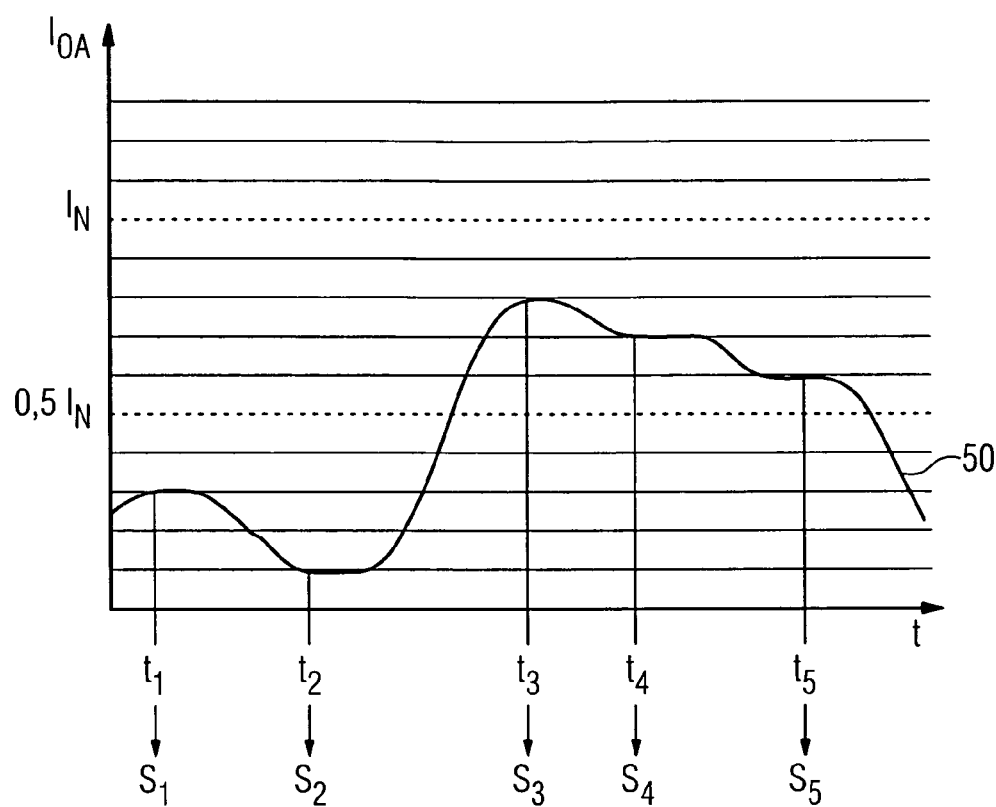

METHOD FOR INCREASING THE SENSITIVITY OF A DIFFERENTIAL PROTECTION SYSTEM

BACKGROUND OF THE INVENTION

Field of the Invention

Electrical protection devices which use specific protection algorithms to make a decision on whether a fault is present on an electrical power transmission line are normally used for fault monitoring for electrical power supply lines. When a fault is found, suitable countermeasures are taken automatically; normally, circuit breakers are opened in order to isolate the fault. One protection algorithm which is frequently used for this purpose is so-called differential protection.

In a differential protection method, an electrical differential protection device is provided at each end of a monitored line section of the electrical power supply line, which differential protection device uses current transformers, which are fitted to the respective ends of the line section, to detect current measured values which indicate the current flowing in that line section. By way of example, the current measured values may be current vector measured values which offer higher accuracy than simple root-mean-square values, since they include information about the amplitude and phase angle of the measured current. The detected current measured values are interchanged via a communication line between the differential protection devices, and are compared with one another. When no faults are present, at one specific point in time, the current which flows into the line section is the same as that which flows out of it again. In consequence, the difference between the magnitudes of the respective current measured values measured at the ends of the line section should result in a value close to zero when no faults are present.

However, if a fault is present on the line section, then a so-called fault current flows via the fault point, and the magnitudes of the current measured values recorded at the ends at the same time no longer correspond. In consequence, this results in a difference between the current measured values which is greater than a specific initiation value, as a result of which the differential protection devices identify that there is a fault on that line section.

The phase affected by the short circuit can then be switched off by means of circuit breakers at the ends of the line section which are connected to the differential protection devices. For this purpose, the differential protection devices produce a so-called TRIP signal (tripping signal) which causes the connected circuit breakers to open their switching contacts, by which means the faulty part of the line section is isolated from the rest of the power supply line.

The method of operation just described operates very reliably for low-impedance short circuits, that is to say those in which the fault resistance is low and, in consequence, a high short-circuit current flows via the fault path. However, so-called high-impedance short circuits can also occur, in particular high-impedance ground shorts. In the case of high-impedance short circuits such as these, a line break, for example, has occurred in an electrical cross-country line and the relevant phase has made contact with the ground. Depending on the condition of the ground, this can result in a short-circuit current which is so low that it is not identified correctly as a short-circuit current with the measurement accuracy of the measurement systems that are used nowadays, in particular the primary transformers, that is to say those current transformers which are connected directly to the electrical power supply line. The measurement accuracy of primary-current transformers such as these is, for example, 3% of the measured current. The sensitivity of the differential protection system is typically set such that false currents (that is to say currents which result from inaccuracies in the measurement system and do not correspond to the actually measured currents) which occur as a result of inaccuracies in the current measurement are, so to speak, ignored. For this purpose, the initiation threshold which leads to the production of a Trip signal is chosen to be comparatively high, that is to say the sensitivity is set to be comparatively low, since only high difference currents lead to tripping of the circuit breakers. This is invariably deliberately chosen since, otherwise, there is a risk of spurious tripping which, in turn, results on the one hand in high costs and on the other hand, in a cascade effect, can lead to overloading and failure of further power supply lines.

Since the described situation of a high-impedance ground short resulting from a line break results, however, in a direct hazard to human life, it is desirable to be able to reliably identify and switch off high-impedance ground shorts such as these as well.

Another example of a high-impedance fault is, for example, leakage currents—comparatively low—which flow as a result of old or inadequate insulation but which, when the insulation finally fails, can easily lead to low-impedance short circuits, which may possibly lead to damage to the electrical power supply system. It is desirable to also be able to identify and switch off comparatively low leakage currents such as these by means of a differential protection system.

BRIEF SUMMARY OF THE INVENTION

As a consequence, the invention is based on the object of upgrading a differential protection system such that it can selectively identify and reliably switch off even high-impedance faults on the monitored line section.

In order to achieve this object, a method is proposed for increasing the sensitivity of a differential protection system, which has in each case one differential protection device at the ends of a line section of an electrical power transmission line, in which current vector measured values which indicate the current flowing in the line section are detected, using the differential protection devices at the ends of the line section during a learning phase; a correction function is determined from the current vector measured values, with the correction function indicating a correction factor which is dependent on the amplitude of the current vector measured values of a selected differential protection device and compensates for any amplitude difference and phase difference between the current vector measured values of the differential protection devices; and the differential protection system is adjusted such that the current vector measured values detected after the learning phase of at least one of the differential protection devices are corrected using the correction function.

The advantage of the method according to the invention is that the differential protection devices match themselves in a self-learning manner to the inaccuracies of the respective measurement system during a learning phase in which it is possible to ensure that there are no faults on the line section of the electrical power supply line. For this purpose, a correction function is obtained from the detected current vector measured values at the ends of the line section and compensates for amplitude and phase differences, which are caused by the respective measurement system, that is to say in particular the respective primary current transformers, between the measured current vectors. When currents are compared by forming the difference between the current vector measured values that are in each case detected at the same point in time at the ends of the line section, it is possible to use a considerably lower response threshold for the differential protection when using current vector measured values that have been corrected in this way, thus increasing the sensitivity of the differential protection system. Comparatively low fault currents in the event of high-impedance faults can therefore also be identified, with the relevant part of the line section being switched off.

One advantageous embodiment of the method according to the invention consists in that in order to produce the correction function, at least two correction factors are used which have been determined from the current vector measured values of the differential protection devices for different amplitudes of the current vector measured values of the selected differential protection device. This advantageously makes it possible to take account of the fact that the inaccuracies which are caused by the respective primary current transformers in the measurement systems have different effects on the measured values of phases and amplitudes depending on the level of the amplitude of the primary current that is flowing. For example, when the primary current that is flowing is small, the phase correction caused by the primary current transformers is dominant whereas, when the primary current that is flowing is large, the amplitude correction caused by the primary current transformers is dominant. This behavior can be taken into account by the formation of the correction function from the determination of individual correction values for different amplitudes of the primary current.

In this context, it is advantageously possible to provide that in order to determine the correction factors, the selected differential protection device in each case produces a start signal when the amplitude of its detected current vector measured values assumes different current threshold values, with the start signal causing the differential protection devices to store the respectively detected current vector measured values for a predetermined time period; and the correction factor is in each case calculated by comparison of current vector measured values which are in each case associated in time with one another of the differential protection devices, which correction factor compensates for any amplitude difference and phase difference between the current vector measured values of the differential protection devices for the amplitude indicated by the respective current threshold value. This allows the system to automatically initiate an automatic measurement of current vector measured values during the learning phase, with these current vector measured values being used to form the correction values for the respective amplitudes of the primary current.

The correction function can particularly advantageously be determined by interpolation from the respectively determined correction factors.

In order to ensure that the current vector measured values recorded at the same time are always used for the calculation of the correction function, it is possible according to a further advantageous embodiment of the method according to the invention to provide that a time stamp is in each case allocated in the differential protection devices to the current vector measured values which are used to determine the correction factors, which time stamp indicates that point in time at which the respective current vector measured value was detected.

In this context, it is considered to be advantageous if in order to produce the time stamps, each of the differential protection devices has internal timers which are synchronized to one another via an external time clock. By way of example this can be done by a time signal derived from a GPS signal being used as the external time clock.

By way of example, the correction function can be formed from the current vector measured values measured by the differential protection devices by means of an external data processing device, for example a laptop or a computer, in a control station. For this purpose, it is considered to be advantageous if the detected current vector measured values are transmitted from the differential protection devices to an external data processing device, and the correction function is determined in the external data processing device.

Alternatively, it is also possible that the detected current vector measured values are transmitted to a computing differential protection device, and the correction function is determined in the computing differential protection device. This is because no further data processing device apart from the differential protection devices is required to determine the correction function.

In order to increase the sensitivity of the differential protection system even further, it is possible according to the invention that the current vector measured values are detected and a correction function is determined for each phase of the line section. This is because this results in the differential protection system being upgraded to form a correction function individually for each phase and also, in consequence, to identify the occurrence of a high-impedance fault individually for each phase.

Furthermore, according to a further advantageous refinement of the method according to the invention, it is possible that current vector measured values are detected and a correction function is determined for the sum of the currents flowing in all the phases and/or for a measured ground current. This also makes it possible to adjust the differential protection devices to compensate for measurement inaccuracies which relate to a ground current, which is calculated by forming the sum of the individual phase currents or is measured explicitly.

The abovementioned object is also achieved by a differential protection system in each case having a differential protection device at the ends of a line section of an electrical power supply line, wherein the differential protection devices have data processing devices which are designed to carry out a method as claimed in one of the embodiments described above.

The invention will be described in more detail in the following text with reference to exemplary embodiments. In this context, in the figures:

BRIEF DESCRIPTION OF THE SEVERAL VIEWS OF THE DRAWING

FIG. 5 shows a current profile measured in a differential protection system.

DESCRIPTION OF THE INVENTION

Figure 1:
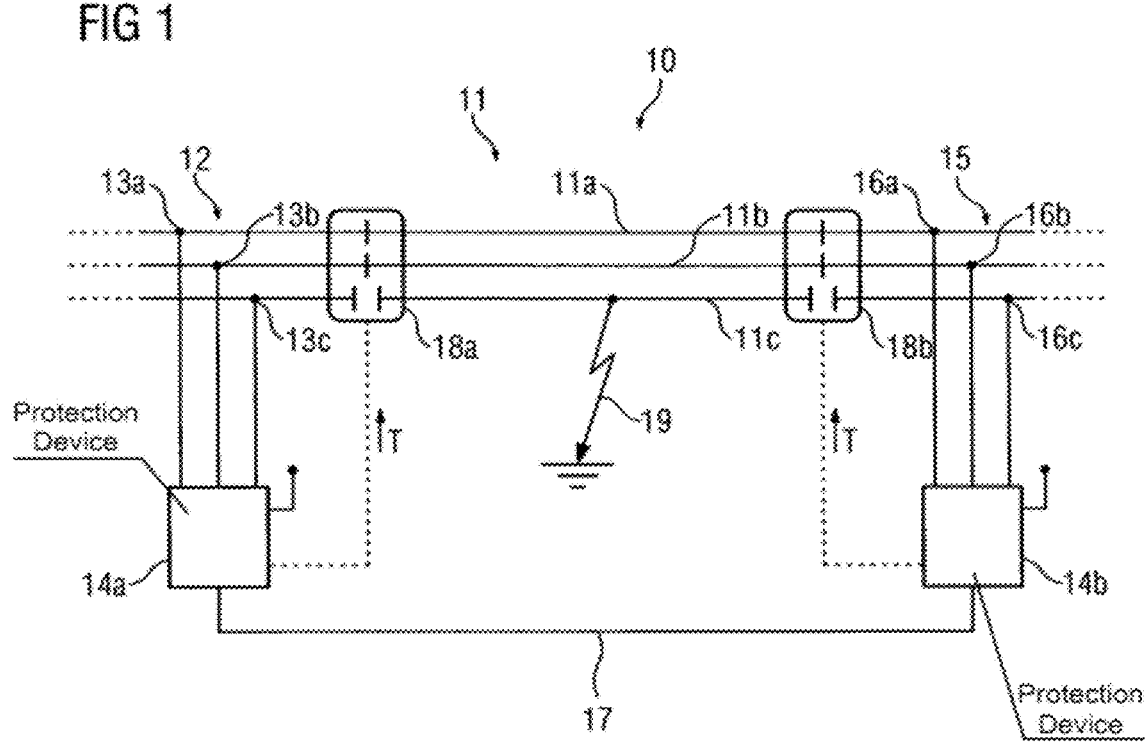
FIG. 1 shows a schematic illustration of a line section with a differential protection system.

FIG. 1 shows a differential protection system 10 which is arranged on a line section 11 of a three-phase electrical power transmission line which is otherwise not illustrated in any more detail. Although, for the sake of simplicity, the line section 11 in FIG. 1 is illustrated as a line section with two ends, it may in this case also be a line section with three or more ends. The method described in the following text is correspondingly applicable to a line section with more than two ends.

The line section 11 shown in FIG. 1 has individual phases 11a, 11b and 11c as a three-phase line section. Currents flowing in the conductor phases 11a, 11b and 11c are measured at a first end 12 of the line section 11 by means of primary current transformers 13a, 13b and 13c which are not illustrated in any more detail, and these current measurements are supplied to a first differential protection device 14a. Currents flowing in the individual phases 11a, 11b and 11c are detected in a corresponding manner at a second end 15 of the line section 11 via primary current transformers 16b and 16c, and these current measurements are supplied to a second differential protection device 14b.

During normal operation, the differential protection devices 14a and 14b monitor the line section 11 for faults, such as short circuits, which may occur. For this purpose, the differential protection devices 14a and 14b transmit the measured values detected by them via a communication path 17 which is provided between them. The communication path 17 may be either cable-based or else wire-free. Normally, copper lines or optical waveguides are used as the communication path 17. The differential protection devices 14a and 14b use their own measured values and the measured values received from the other end to check, by forming the difference between the measured values which are in each case recorded at the same point in time, whether there is a fault on the line section 11 of the power transmission line.

To do this, each differential protection device 14a and 14b checks whether the difference between its own measured values and the received measured values exceeds an initiation threshold and emits a Trip signal (tripping signal) T if this threshold is exceeded to a circuit breaker 18a or 18b which is respectively associated with it. If the measured values for each phase are detected and transmitted individually, it is also in this way possible to clearly determine which is the faulty phase. The Trip signal T causes the respective circuit breaker 18a or 18b to open its switching contacts associated with the respective faulty phase in order in this way to disconnect the faulty phase from the electrical power transmission line.

By way of example, FIG. 1 shows a short circuit 19 between the phase 11c of the line section 11 and ground; switching contacts associated with the relevant phase 11c in the circuit breakers 18a and 18b are each opened in order to isolate the phase 11c from the electrical power transmission line.

In modern digital differential protection devices, the current measured values detected by the primary current transformers 13a, 13b, 13c and 16a, 16b, 16c are converted to current vector measured values which allow a statement to be made on the amplitude and phase angle of the current flowing at the respective end 12 or 15.

For this purpose, the current vector measured values are normally recorded using the complex representation. The following vector measured values are detected for the end 12 of the line section 11:

$I_{0A1} \cdot e^{-j\omega t_{0A1}}$, $I_{0A2} \cdot e^{-j\omega t_{0A2}}$, and $I_{0A3} \cdot e^{-j\omega t_{0A3}}$, where $I_{0A1}$ is the amplitude of the phase 11a, $I_{0A2}$ is the amplitude of the phase 11b and $I_{0A3}$ is the amplitude of the phase 11c, in each case at the end 12 of the line section. Correspondingly, $\omega t_{0A1}$ represents the phase angle of the current in the phase 11a, $\omega t_{0A2}$ represents the phase angle of the current in the phase 11b, and $\omega t_{0A3}$ represents the phase angle of the current in the phase 11c. In a corresponding manner, the detected current vectors for the second end 15 of the line section 11 can be recorded as follows:

$I_{0B1} \cdot e^{-j\omega t_{0B1}}$, $I_{0B2} \cdot e^{-j\omega t_{0B2}}$, and $I_{0B3} \cdot e^{-j\omega t_{0B3}}$, where the index "B" in each case indicates the second end 15.

The transmission of the current vector measured values and the comparison in the respective differential protection devices 14a and 14b are likewise carried out using the vector notation. In order to in each case compare the current vector measured values recorded at the same point in time with one another, the current vector measured values are allocated a time stamp, which indicates the point in time for their detection, in the respectively detecting differential protection device 14a or 14b. Allocation of a time stamp also reduces the requirements for the communication path 17 that is provided between the deferential protection devices 14a and 14b, since, without the need for real-time data transmission, all the current vector measured values detected at the same time can be associated with one another on the basis of their time stamp.

Figure 2:
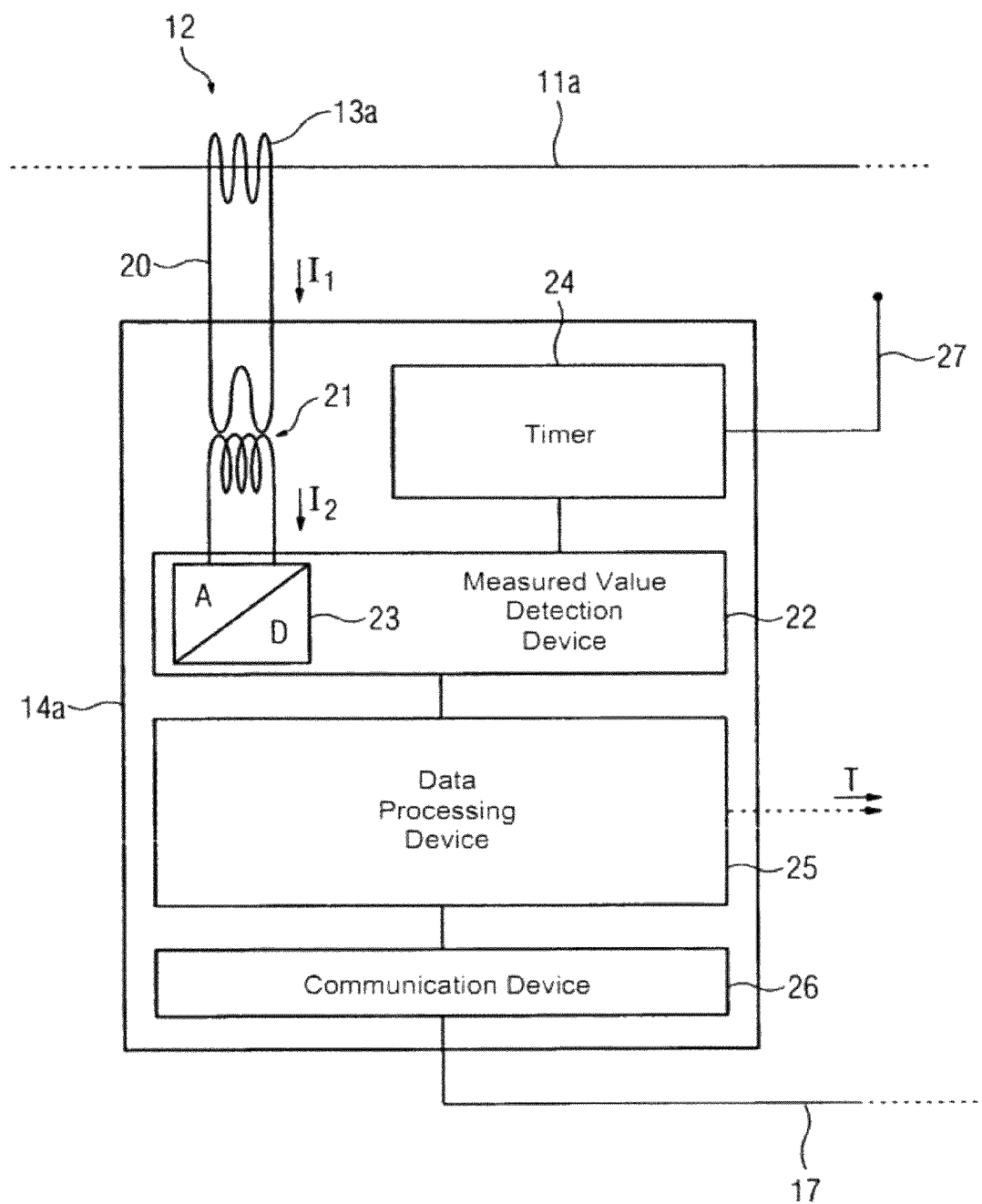
FIG. 2 shows a schematic illustration of a differential protection device.

By way of example, FIG. 2 shows the differential protection device 14a illustrated in detail. For the sake of clarity, the differential protection device 14a shown in FIG. 2 is connected only via the primary transformer 13a to the phase 11a at the end 12 of the line section 11. FIG. 2 does not show the detection of the measured values relating to the other phases 11b and 11c; however, this is done in a corresponding manner.

The current flowing in the phase 11a at the end 12 is detected by means of the primary current transformer 13a which, for example, may be a toroidal core current transformer. In this case, a measured current I1, which is reduced corresponding to the transformer step-up ratio of the primary current transformer 13a, is produced in a measurement circuit 20 of the primary current transformer 13a, and is supplied to the differential protection device 14a via connecting lines from the measurement circuit 20. For galvanic decoupling, the differential protection device 14a has an internal current transformer 21, by means of which the current I1 flowing in the measurement circuit 20 is converted to a current I2, which is once again less.

The current I2 is supplied to a measured value detection device 22 in the differential protection device 14a. The measured value detection device 22 has an analog/digital converter 23, by means of which it converts the received current I2 to digital current vector measured values. In addition, the measured value detection device 22 may also carry out further measured value preprocessing, for example (analog or digital) filtering.

In addition, the differential protection device 14a has an internal timer 24 which is synchronized via an external time signal with the internal timers of other differential protection devices—in particular of the differential protection device 14b. By way of example, the external time signal may be a time signal which is derived from a GPS signal received by means of an antenna 27. Another example of an external timer is a time clock of a so-called "real-time Ethernet network"; in this case, an appropriate Ethernet interface is provided instead of the antenna 27, via which the device can also communicate in the network.

The internal timer 24 passes a time signal to the measured value detection device 22, which allocates a time stamp to each detected current vector measured value, indicating that point in time at which the current vector measured value was detected.

Including its time stamp, each current vector measured value is supplied to a data processing device 25 in the differential protection device 14a. The data processing device 25a is connected to a communication device 26 which is in turn connected to the communication path 17 in order to transmit the current vector measured values detected in the differential protection device 14a, including their time stamp, via the communication path 17, and to receive current vector measured values detected by the differential protection device 14b.

In a manner that has already been described, a decision is made in the data processing device 25, by means of a comparison of the current vector measured values detected in the first differential protection device 14a with those which have been transmitted from the second differential protection device 14b, as to whether there is a short circuit on the phase 11a of the line section 11. If appropriate, a Trip signal T is produced, and is emitted to the circuit breaker 18a, which is not illustrated in FIG. 2.

The detection of the current flowing in the phase 11a includes inaccuracies from the overall measurement system in the resultant current vector measured values, that is to say from the primary current transformer 13a, the device-internal current transformer 21, the analog/digital converter 23 and any additional filters and preprocessing units of the measured value detection device 22. The main component of the inaccuracies is normally due to the primary current transformer 13a, which typically has a measurement accuracy of about 3% of the measured current. Since the measurement systems of the differential protection devices 14a and 14b are not absolutely identical, they in consequence have different measurement inaccuracies, which make it more difficult to compare the current vector measured values, particularly when the currents flowing are small. This is particularly evident when a high-impedance fault, for example a ground short with poor conductivity of the ground is involved, occurs on the phase 11a of the line section, with the current flowing being so small that it is normally within the range of the fluctuations caused by the inaccuracy of the respective measurement system. Because of the different discrepancies which the measurement systems of the differential protection devices 14a and 14b produce, it is in consequence not possible to make a clear decision on the basis of the different discrepancies as to whether there is a high-impedance fault on the phase 11a or whether the current vector measured values have merely been corrupted by the inaccuracies of the measurement systems.

Figure 3:
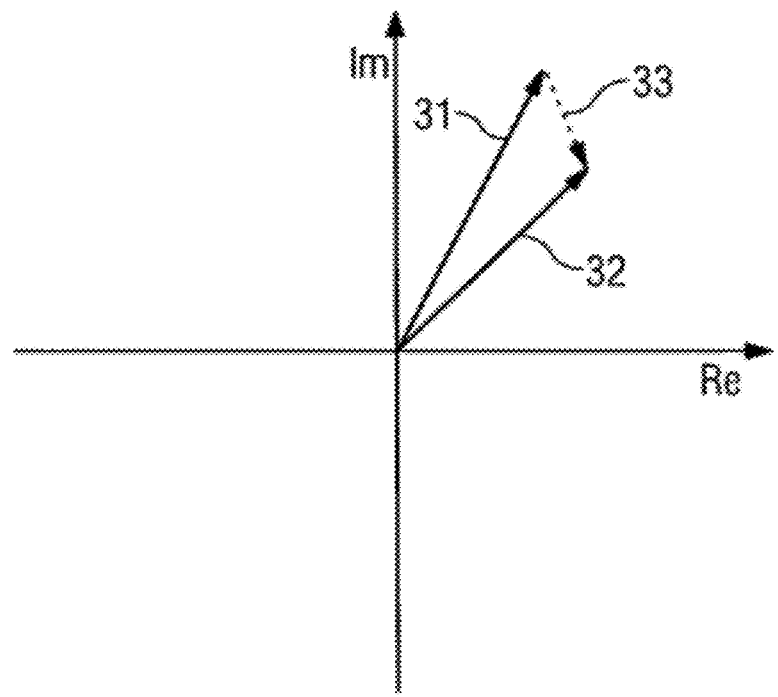
FIG. 3 shows a vector diagram.

FIG. 3 explains this problem. In this context, FIG. 3 shows a diagram to indicate complex current vectors, showing two current vector measured values 31 and 32 by way of example. The current vector measured values 31 and 32 were detected at the same point in time, but at different ends, on the same phase (for example the phase 11a) of the line section 11. By way of example, the current vector measured value 31 was detected by the differential protection device 14a at the first end 12 of the line section 11, while the current vector measured value 22 was detected at the same point in time by the differential protection device 14b at the second end 15 of the line section 11. Although both current vectors actually indicate the same primary current flowing in the line section, the amplitude and phase angle of the two current vectors 31 and 32 result in a difference vector 33, which is indicated by a dashed line in FIG. 3. This difference vector 33 is caused only by the inaccuracies in the two measurement systems used, but not by a fault actually having occurred on the line section 11.

In order to prevent the line section 11 from being switched off undesirably, the response threshold must therefore be above this difference vector 33. This would greatly restrict the sensitivity of the differential protection system, particularly when small currents are flowing, as is normally the case with high-impedance faults.

A method by means of which the sensitivity of the differential protection system can be increased in such a way that even high-impedance faults can be reliably identified will therefore be explained in the following text, with reference to FIG. 4. For this purpose, the differential protection devices 14a and 14b in the differential protection system 10 are adjusted during a so-called learning phase such that their sensitivity is considerably increased after the learning phase.

During the learning phase which, for example, may last for several days up to several weeks, it is assumed that no (high-impedance or low-impedance) fault has occurred on the line section 11 of the electrical power supply line. If a fault were nevertheless to occur, then the calculations carried out at this point in time for increasing the sensitivity would have to be rejected. Low-impedance faults during the learning phase are identified in any case by the differential protection devices, because this does not require increased sensitivity. High-impedance faults are identified by more detailed observation of the lines, since a crack in a power transmission line can be seen well visually.

Figure 4:
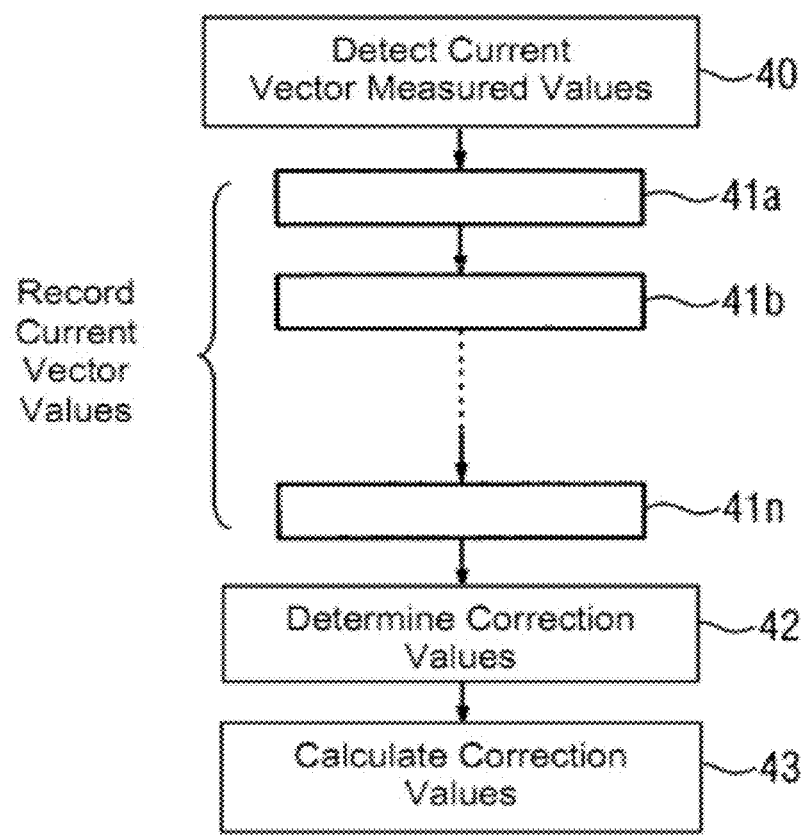
FIG. 4 shows a method flowchart, illustrated schematically.

According to FIG. 4, in a first step of the learning phase 40, current vector measured values are detected by the differential protection devices 14a and 14b. One of the differential protection devices 14a or 14b is defined as the selected differential protection device, which from then on controls the functions carried out during the learning phase. By way of example, it is assumed that the differential protection device 14a is defined as the selected differential protection device for control of the learning phase.

The selected differential protection device 14a then checks the detected current vector measured values to determine whether the amplitude has reached specific different current thresholds. If a current threshold such as this has been reached, then the selected differential protection device 14a emits a start signal which causes all the protection devices, that is to say both the selected differential protection device 14a and the other differential protection device 14b, to store the detected current vector measured values, including the associated time stamp, for a specific time period, for example for one second.

This procedure will be explained in more detail with reference to FIG. 5. FIG. 5 shows an example of a profile 50 of the amplitude of the current in one phase at the line end 12. The amplitude of this current is detected by the selected differential protection device 14a, and is checked to determine whether it has reached specific current thresholds (illustrated by dashed and dotted lines in FIG. 5). By way of example, current thresholds such as these may cover a range from 0 up to 1.3 times the rated current $I_N$ for which the line section 11 is intended, in steps of $0.1 \cdot I_N$. By way of example, the current threshold of $0.3 \cdot I_N$ is reached at a first point in time $t_1$. A first start signal $S_1$ is then produced at the point in time $t_1$, causing the two differential protection devices 14a and 14b to store the current vector measured values detected by them for a time period of, for example, 1 second. To do this, the start signal must be available both internally to the selected differential protection device 14a and via the communication path to the other differential protection device 14b. However, this does not depend on both differential protection devices starting to store the detected current vector measured values at the same time; it is completely sufficient for some of the detected current vector measured values to have been detected at the same time (for example over a duration of three cycles of the rated frequency).

In the further profile of the amplitude of the monitored current, a current threshold of $0.1 \cdot I_N$ is reached at a point in time $t_2$, and a second start signal $S_2$ is produced, which causes both differential protection devices 14a and 14b to store their respectively detected current vector measured values for the predetermined time period. A corresponding situation applies to the points in time $t_3$, $t_4$ and $t_5$, for which start signals $S_3$, $S_4$ and $S_5$ are produced for the current thresholds $0.8 \cdot I_N$, $0.7 \cdot I_N$ and $0.6 \cdot I_N$.

After a sufficiently long learning phase, a respective data record with time-stamped current vector measured values will have been recorded and stored in this way for each current threshold in both differential protection devices 14a and 14b, by virtue of the continual load change on the line section 11 of the power transmission line.

By way of example, FIG. 4 shows the recording of current vector measured values relating to the respective current thresholds by the steps 41a to 41n.

By comparison of the respective current vector measured values detected at the same time by the differential protection devices 14a and 14b, dependent correction values can be in each case determined in step 42 from the amplitude of the current which corresponds to the respective threshold value for formation of the start signals, which correction factors compensate for any amplitude difference and phase difference between the respective current vector measured values of the differential protection devices 14a and 14b. These correction factors are used, so to speak, to compensate for the difference vector 33 (cf. FIG. 3), which is produced by the inaccuracy of the two measurement systems used in the differential protection devices 14a and 14b, for different amplitudes of the measured current. The correction values are amplitude-dependent since, for example, the primary transformers produce a large phase discrepancy when the primary current amplitudes are small, while the inaccuracies of the primary current transformers produce a high amplitude discrepancy when the amplitudes of the primary current are high. The correction values must therefore be produced for different amplitudes or threshold values, as shown in FIG. 5, of the current measured by the selected differential protection device 14a.

In order to determine the correction values, the respective current vector measured values of the two differential protection devices 14a and 14b are compared with one another such that those time windows in which the current vector measured values remain relatively constant are in each case selected from the respective data records which comprise current vector measured values, time-stamped for a selected amplitude, over the specific time period. This is intended to prevent the correction values from being corrupted by comparatively short fluctuations in the current vector measured values, for example caused by switching operations. The required time windows have a duration of at least one cycle of the fundamental (for example 50 or 60 Hz) of the current flowing in the line section; as the time window length increases, the accuracy of the calculation rises, but also the computation time required for the calculation. Time windows with a duration of three cycles of the fundamental are preferably used.

The time windows are also distinguished in that they each contain current vector pairs detected exclusively at the same points in time, for each differential protection device 14a and 14b. A digital Fourier transformation, preferably a so-called "Fast Fourier Transformation" (FFT), is carried out for these measurement windows, and is used to determine a respective correction factor to compensate for the difference between the amplitude and phase angle of the two current vector measured value profiles.

Once correction factors have been determined in this way over the desired amplitude range, that is to say by way of example from 0 to $1.3 \cdot I_N$, then, in a further step 43 (FIG. 4), a correction function which covers the amplitude range without any discontinuities can be formed by interpolation between the individual correction values.

By way of example, the correction values and the correction function may be formed in an external data processing device, for example a laptop, to which the respective current vector measured values relating to the various amplitudes of the current profile have been transmitted. However, it is also possible for the correction factors and the correction function to be calculated in a differential protection device which is defined as the "computing differential protection device", for example the selected differential protection device 14a. For this purpose, all the recorded, time-stamped current vector measured values are transmitted to the computing differential protection device. In the last-mentioned case, no further device is required in addition to the differential protection devices 14a and 14b.

The calculation of the correction function in step 43 as shown in FIG. 4 completes the learning phase of the differential protection system. From then on, the differential protection devices 14a and 14b must be adjusted such that the differential protection function, that is to say the comparison of the respective current vector measured values, is carried out only after recalculation of either the current vector measured values of the first or of the second differential protection device, using the correction function, depending on which of the current vector measured values the correction function has been developed for. By way of example, the first differential protection device 14a can leave its current vector measured values unchanged for this purpose, while the second differential protection device 14b applies the amplitude-dependent correction function to its current vector measured values and in this way produces corrected current vector measured values which are used for the differential protection comparison. In consequence, the second differential protection device 14b in this example transmits only the corrected current vector measured values to the first differential protection device 14a, while the first differential protection device 14a transmits its unchanged current vector measured values to the second differential protection device 14b.

Alternatively, it is also possible not to correct the current vector measured values until after transmission, for example such that the second differential protection device 14b would transmit its unchanged current vector measured values to the first differential protection device 14a, and the received current vector measured values would be corrected by means of the correction function only in the first differential protection device 14a.

The only important factor in this case is that either the current vector measured values of the first or of the second differential protection device are in any case corrected using the correction function, and that the differential protection function is carried out with current vector measured values which have been corrected in this way.

The measured current vector measured values are, so to speak, matched in the described manner to a reference device, in this case the selected differential protection device 14a, such that, irrespective of the respective corruption of the current vector measured values as a result of the inaccuracies of the respective measurement system, correct values are obtained during a difference formation process using the respective corrected current vector measured values, because the inaccuracies are overcome by the correction process. The matching of the two measurement systems to one another carried out in this way increases the sensitivity of the differential protection system such that it is possible to detect even high-impedance faults when small currents are flowing, since the inaccuracies of the respective measurement systems now play only a negligible role, even when the currents are small.

The response threshold in the respective differential protection devices, from which a trip signal is produced, can in consequence be set to be considerably lower, as a result of which even high-impedance faults with small fault currents flowing, which in consequence also leads to there being only a small difference between the respective current vector measured values, can be detected and switched off without any negative influence on the selectivity of the differential protection. The described method is advantageously carried out separately for each phase of the line section, in order to obtain a phase-selective differential protection system after the matching of the differential protection devices. It is also advantageous for the method to be carried out for a ground current which is calculated from the individual phase currents by addition, or for a ground current which is measured explicitly by a ground current transformer.

The invention claimed is:

1. A method for increasing a sensitivity of a differential protection system having one differential protection device connected at each end of a line section of an electrical power transmission line, the method which comprises:
   detecting current vector measured values indicating a current flowing in the line section, using the differential protection devices at the ends of the line section during a learning phase;
   determining a correction function from the current vector measured values, the correction function indicating a correction factor that is dependent on an amplitude of the current vector measured values of a selected differential protection device and compensates for any amplitude difference and phase difference between the current vector measured values of the differential protection devices; and
   adjusting the differential protection system such that the current vector measured values detected after the learning phase of at least one of the differential protection devices are corrected using the correction function.

2. The method according to claim 1, wherein the step of determining the correction function comprises using at least two correction factors that have been determined from the current vector measured values of the differential protection devices for different amplitudes of the current vector measured values of the selected differential protection device.

3. The method according to claim 2, wherein:
   in order to determine the correction factors, producing with the selected differential protection device a start signal when the amplitude of its detected current vector measured values assumes different current threshold values, the start signal causing the differential protection devices to store the respectively detected current vector measured values for a predetermined time period; and
   calculating each of the correction factors by comparing current vector measured values that are in each case associated in time with one another of the differential protection devices, which correction factor compensates for any amplitude difference and phase difference between the current vector measured values of the differential protection devices for the amplitude indicated by the respective current threshold value.

4. The method according to claim 2, which comprises determining the correction function by interpolation from the correction factors.

5. The method according to claim 2, which comprises associating a time stamp in each of the differential protection devices to the current vector measured values used to determine the correction factors, the time stamp indicating a point in time at which the respective current vector measured value was detected.

6. The method according to claim 5, which comprises producing the time stamp with a respective internal timer in each of the differential protection devices, wherein the internal timers are synchronized to one another via an external time clock.

7. The method according to claim 6, which comprises using a time signal derived from a GPS signal as the external time clock.

8. The method according to claim 1, which comprises:
   transmitting the detected current vector measured values from the differential protection devices to an external data processing device; and
   determining the correction function in the external data processing device.

9. The method according to claim 1, which comprises:
   transmitting the detected current vector measured values to a computing differential protection device; and
   determining the correction function in the computing differential protection device.

10. The method according to claim 1, which comprises detecting the current vector measured values and determining a correction function for each phase of the line section.

11. The method according to claim 1, which comprises detecting current vector measured values and determining a correction function for a sum of the currents flowing in all phases and/or for a measured ground current.

12. A differential protection system for a power transmission line, comprising:
   two differential protection devices respectively connected at the ends of a line section of the power transmission line;
   said differential protection devices having data processing devices configured to execute the method steps according to claim 1.

* * * * *